Figure 1:
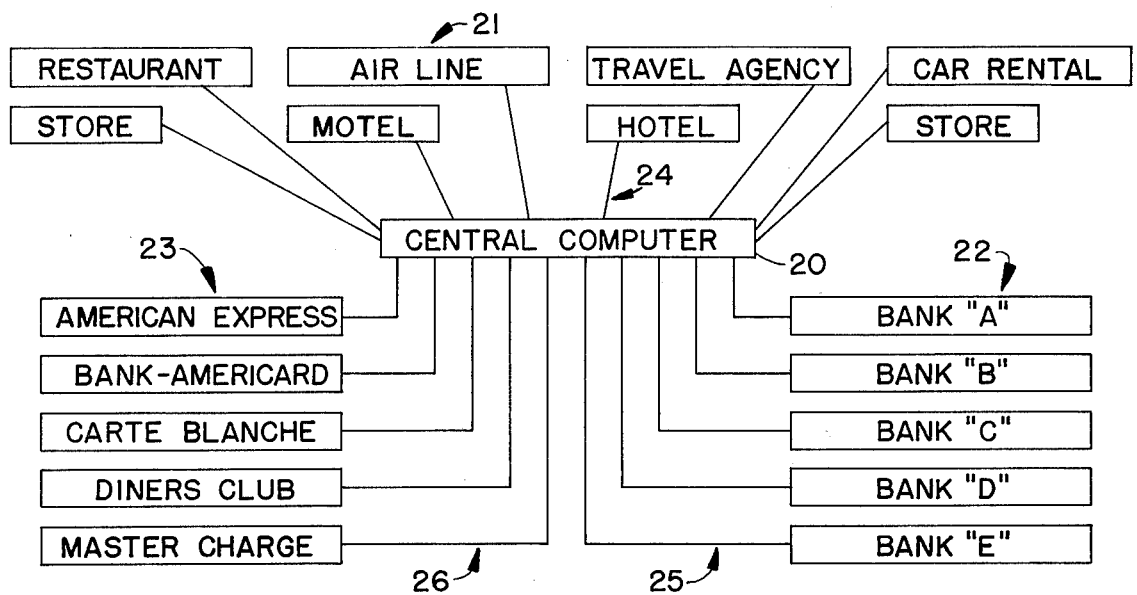

United States Patent [19]

Haker

[11] 4,032,931
[45] June 28, 1977

[54] MONEY TRANSFER DEVICE KEYBOARD TERMINAL

[76] Inventor: Floyd H. Haker, 6546 Linden Lane, Dallas, Tex. 57230

[22] Filed: Dec. 22, 1975

[21] Appl. No.: 643,103

[52] U.S. Cl. ............................. 340/365 R; 35/6; 197/4; 197/98; 340/149 A; 340/337

[51] Int. Cl.² .................. H04Q 3/00; G06K 15/18; G06F 3/02

[58] Field of Search ........... 340/365 R, 149 A, 337; 273/85, 153 S, 130 AB; 35/6, 10; 197/98, 4; 200/280, 281, 312, 5 R, 293, 307, 295

[56] References Cited

UNITED STATES PATENTS

| | | | |
|---|---|---|---|
| 1,845,947 | 2/1932 | Weisner et al. | 197/4 |
| 3,120,583 | 2/1964 | Cornell | 35/6 |
| 3,404,889 | 10/1968 | Warner | 273/130 AB |
| 3,414,985 | 12/1968 | Ashley | 35/6 |
| 3,456,363 | 7/1969 | Boxley | 35/10 |
| 3,517,792 | 6/1970 | Abrahamsen | 197/4 |
| 3,760,409 | 9/1973 | Ruben et al. | 197/98 |
| 3,900,712 | 8/1975 | Fukao | 200/295 |

*Primary Examiner*—Marshall M. Curtis
*Attorney, Agent, or Firm*—Warren H. Kintzinger

[57] ABSTRACT

A double keyboarded entry terminal for use in entering money transactions between customer and vendor in conjunction with a central computer, banks, and credit card companies, with physical and/or electronic security features which preclude access to secret coded entries by customer and vendor, one from the other, and collectively, from third party "visual eavesdroppers." Security features include physical screening as well as mechanical and electronic realignment of numeric key entry functions.

12 Claims, 16 Drawing Figures

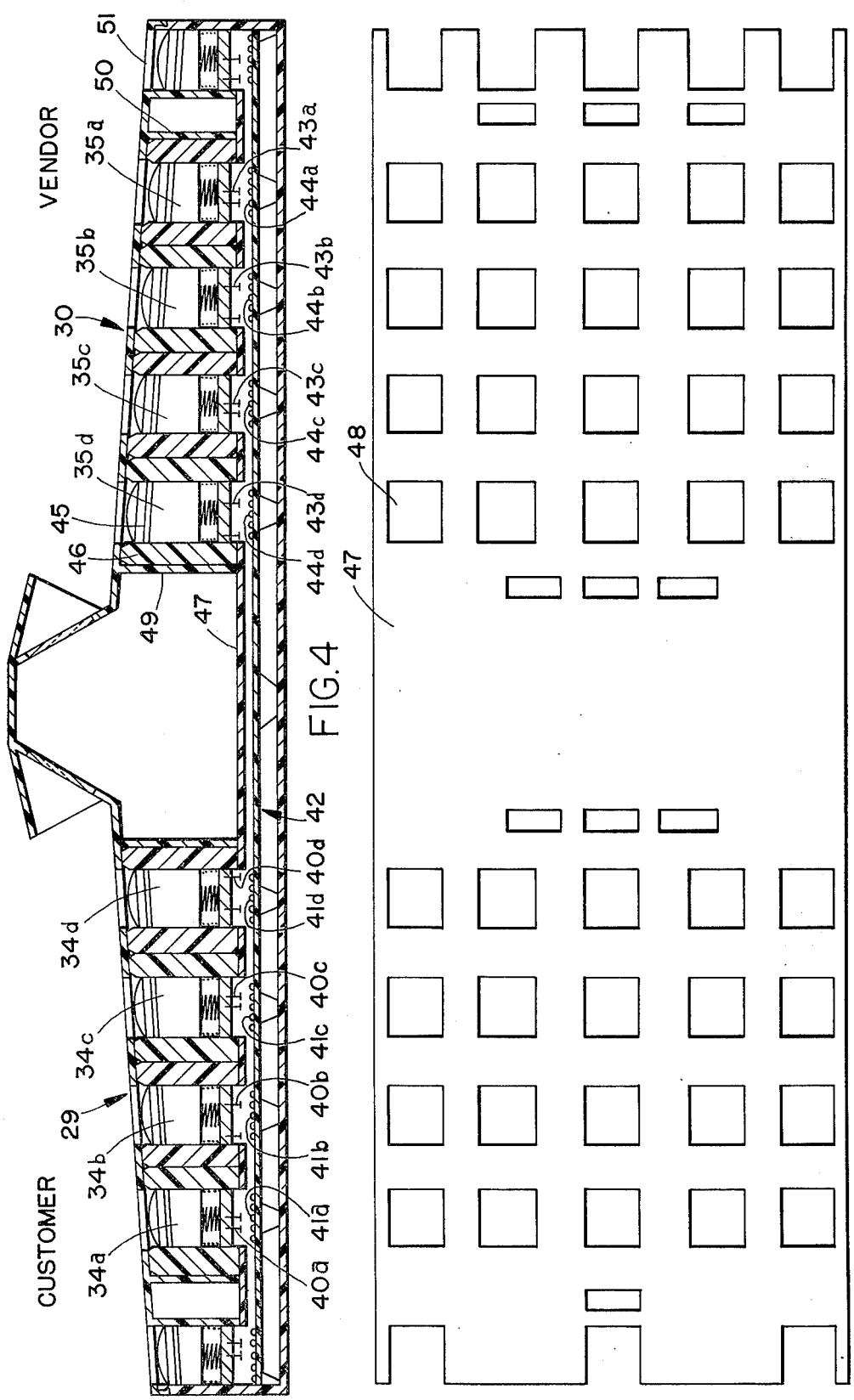

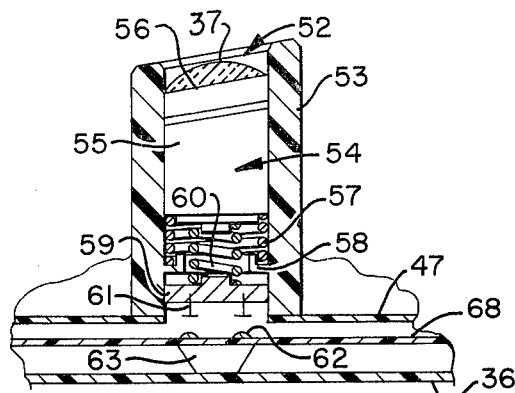
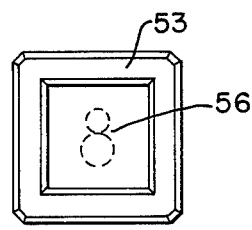
FIG. 6
FIG. 7
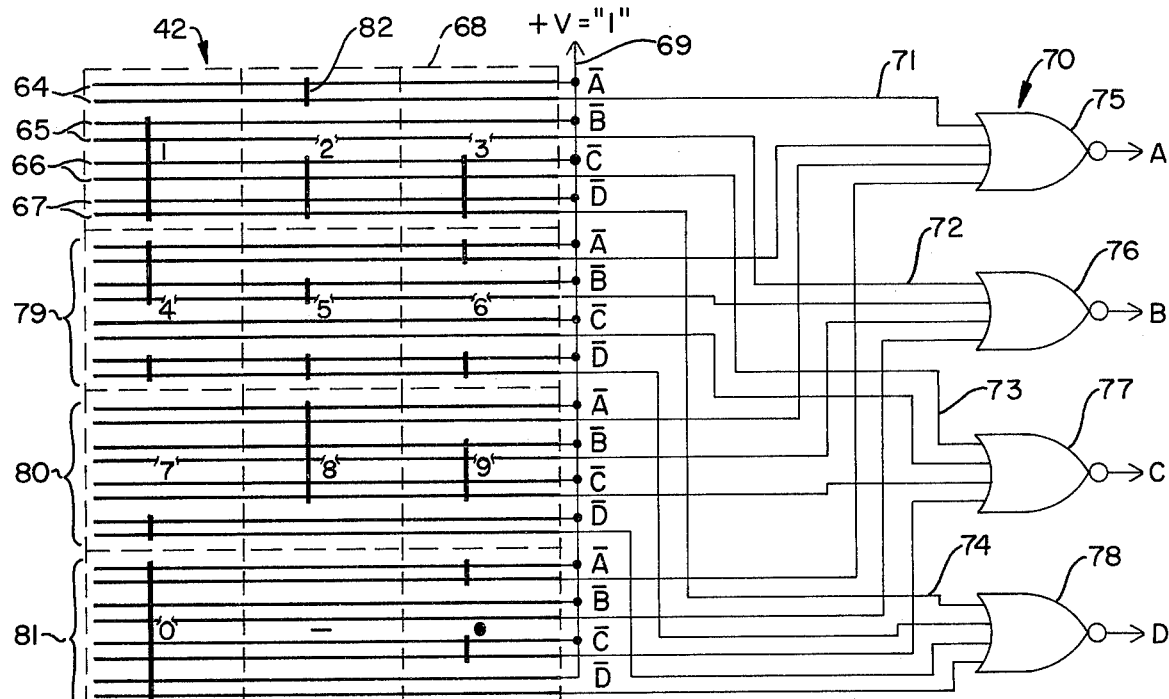
FIG. 8
| KEY FUNCTION | BINARY DCBA | BINARY DCBA |
|---|---|---|
| 0 | 0000 | 1111 |
| 1 | 0001 | 1110 |
| 2 | 0010 | 1101 |
| 3 | 0011 | 1100 |
| 4 | 0100 | 1011 |
| 5 | 0101 | 1010 |
| 6 | 0110 | 1001 |
| 7 | 0111 | 1000 |
| 8 | 1000 | 0111 |
| 9 | 1001 | 0110 |
| • | 1010 | 0101 |
FIG. 9
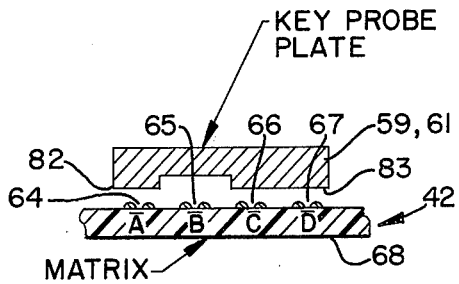
FIG. 10

MONEY TRANSFER DEVICE KEYBOARD TERMINAL

This invention relates in general to electronic devices used in financial transactions, and in particular, to a customer-vendor co-usable keyboard terminal device which may be employed in a data processing system to provide transfer of debits and credits between and among vendors, customers, banks, credit card companies and cash card operations.

An important portion of business today is accomplished through the following methods: credit cards, checks, charge accounts and cash. Each of these methods have some degree of risk, e.g., stolen credit cards, bogus and forged checks. Charge accounts can be classified with credit cards since the stores issue their own cards. Cash can also be counterfeit. Tremendous losses are encountered by the merchants and much aggravation and loss to the legal card holders, the victims of forged checks, etc., because of unscrupulous individuals. Therefore, the purchaser and merchant of good character need protection.

The paper load in business today is staggering, and both costly and time consuming. Credit card tickets must be filled in by hand and have many copies, some of which are hardly legible. These must be accumulated by the clerks, transferred to bookkeeping departments, recorded, bundled and forwarded to possibly five different credit card companies, and the merchant then waits to be paid. Checks must be moved from bank to bank before the business can determine their worth. Again, these must be recorded, bundled and transported, deposited, etc. Cash must be counted in dollars and coin, bundled and transported, and deposited. During this time these valuable documents are in constant jeopardy of theft, loss, fire and other accidental incidents that could prove to be very costly.

Some types of safeguards have been devised but are not automatic, e.g., changing the credit card frequently, laws passed not holding the card holders responsible for over a set number of dollars, etc. This is good for the card holder, but it costs the business untold dollars. Checks must be checked with the banks, identification taken and recorded on the checks, etc. Cash is almost impossible to protect against a trained counterfeit passer, unless the clerk is trained by the United States Treasury Department. The store checks credit cards primarily for proper identification, if at all, and the devices used in the stores are mostly used for accounting purposes and inventory control.

There are other large, more complicated accounting, inventory, and cost control systems that utilize a computer and a computer program in conjunction with telephone lines encompassing a keyboard and large display screens, but these are not used between the everyday shopper and merchant. Banks today are still using private aircraft to transport checks to eliminate what the industry calls the "float." So the banks are not engaged in the electronic processing of money beyond accounting.

An improved method of handling money and credit, safely and automatically in the least possible time, without physically handling money, checks, and credit card receipts, would obviate the above problem areas, and necessitate certain secure entry safeguards of both vendor and customer.

Accordingly, it is a principle object of the present invention to provide, in an electronic financial transaction system, a new system of entering data at the point of sale in a safe and fool-proof manner, wherein the purchaser and the seller must conduct certain entries privately and out of view from one another but yet on the same instrument.

Another object of the invention is to provide a keyboard entry system for co-use by vendor and customer, incorporating security measures by means of which third party observers are precluded from visually ascertaining customer and/or vendor keyboard entries.

Still another object is the provision of a keyboard entry system for co-use by vendor and customer which precludes third party detection of numerical keyboard entires by either customer or vendor, by provision for numerical entry key function realignment by vendor and/or customer before and/or during and/or after a transaction sequence.

Features of this invention useful in accomplishing the above objects include, in a keyboard terminal for use with a central money transaction computer system, a keyboard terminal having first and second keyboard for respective use of vendor and customer. The keyboards extend oppositely from a raised, centrally located double-sided display device for respective private viewing by vendor and customers. The customer keyboard embodies a plurality of function keys, some of which are common to the vendor's side, and others of which are unique to the customer's needs to make secured, private transactions through the terminal to banks and credit card companies which make up a completely money transfer system. Security measures for assuring private, undetectable entries by customer and vendor include means for either a physical or electronic realignment of numeric key entry functions on a selected physical basis or on a preselected or randon sequenced electronic basis.

Specific embodiments representing what are presently regarded as the best mode of carrying out the invention are illustrated in the accompanying drawing.

Figure 2:
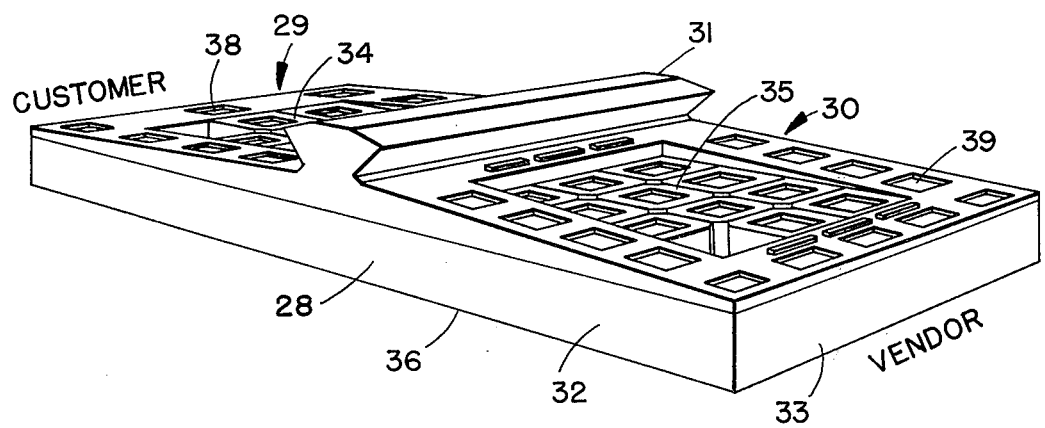
Figure 3:
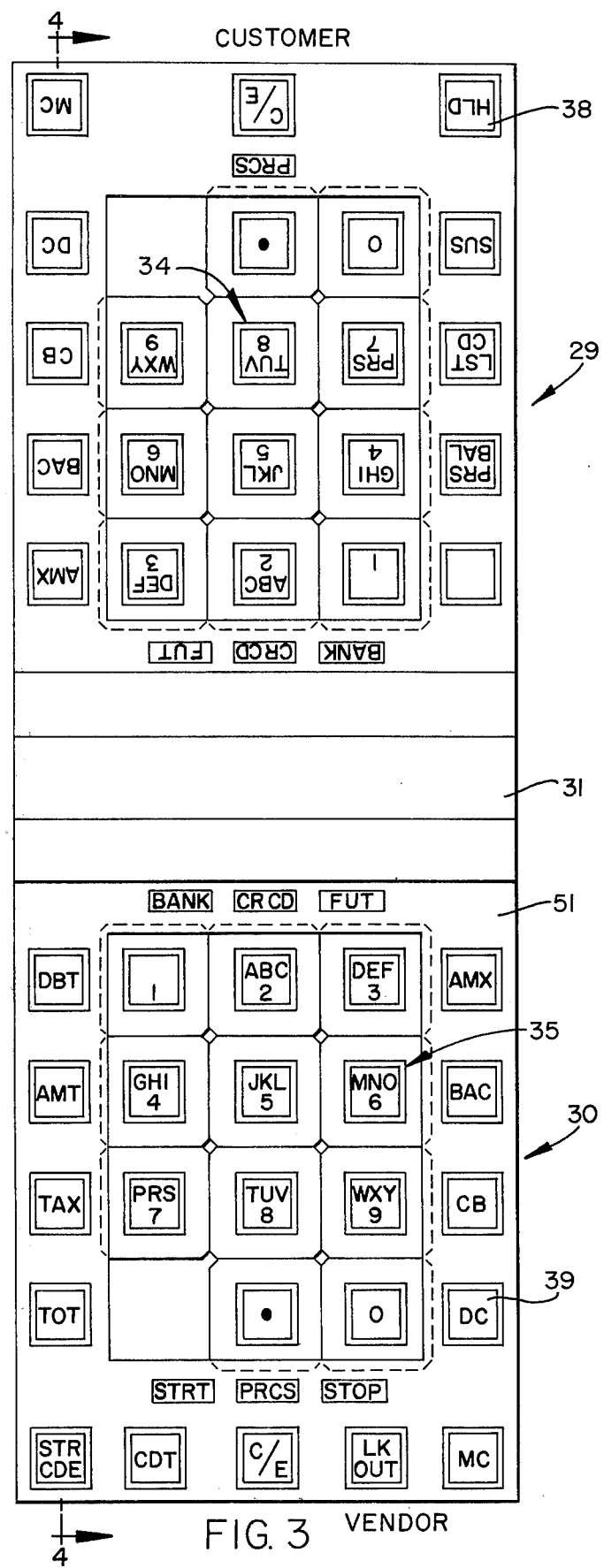
Figure 11:
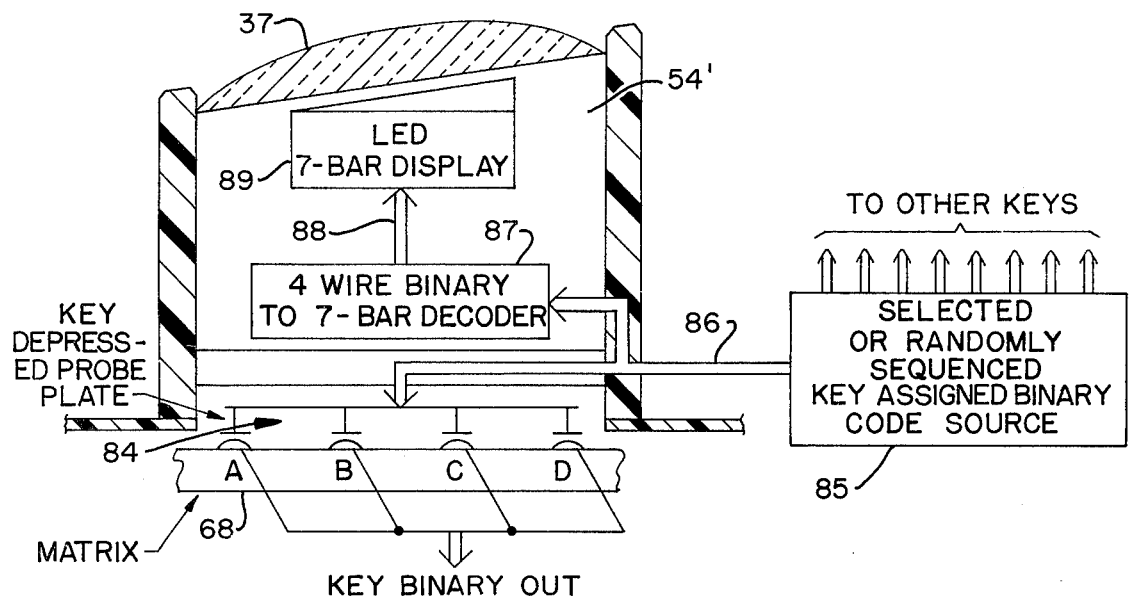
Figure 12:
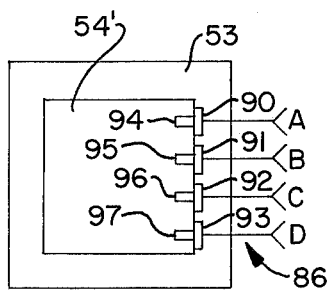
Figure 13:
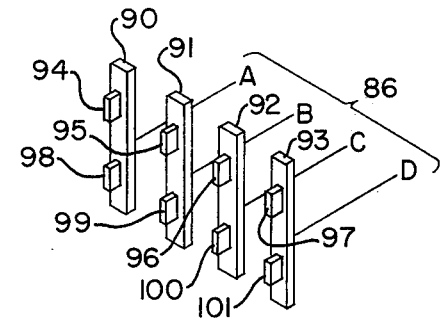
Figure 14:
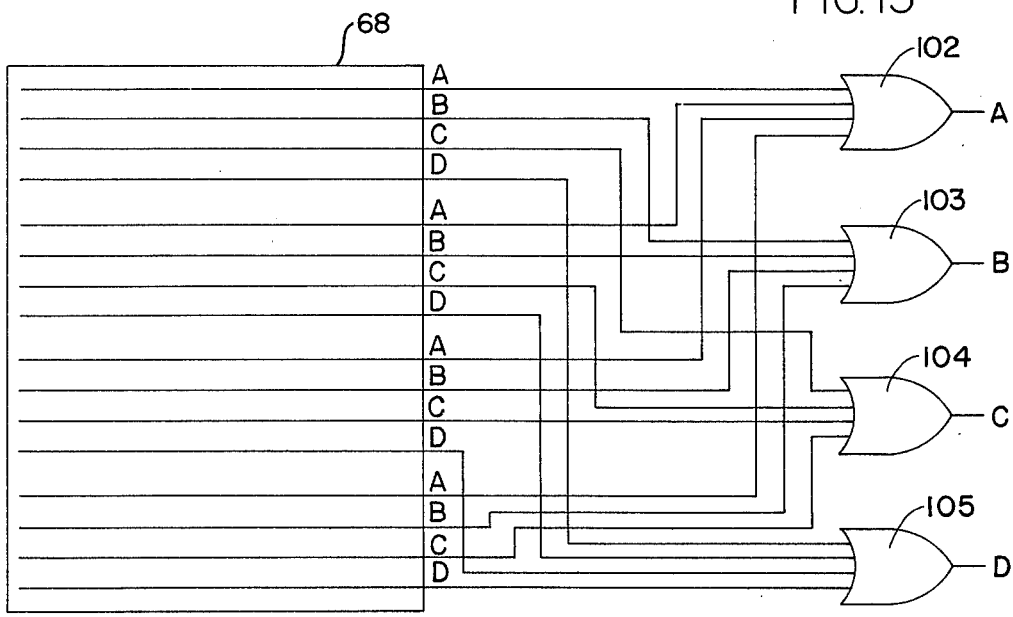
Figure 15:
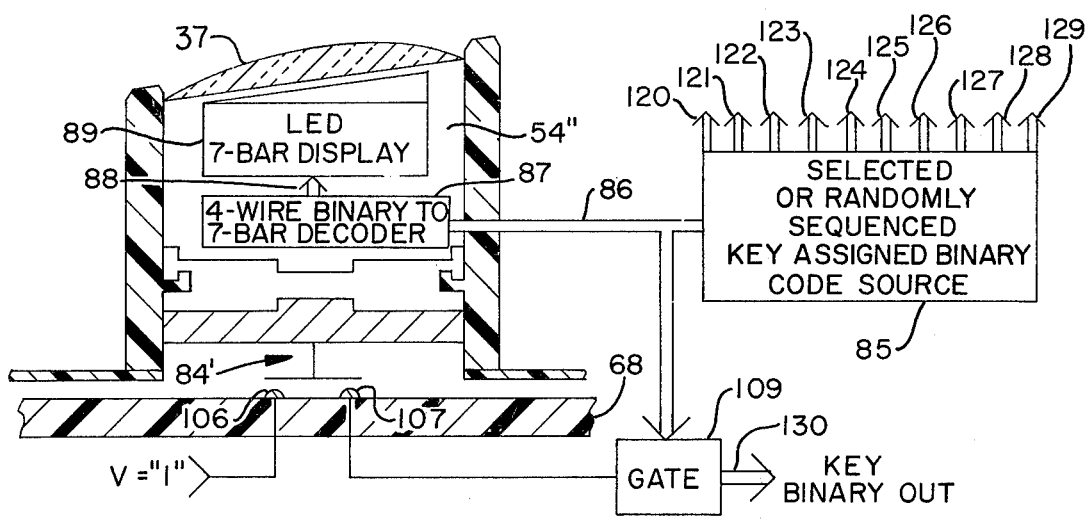
Figure 16:
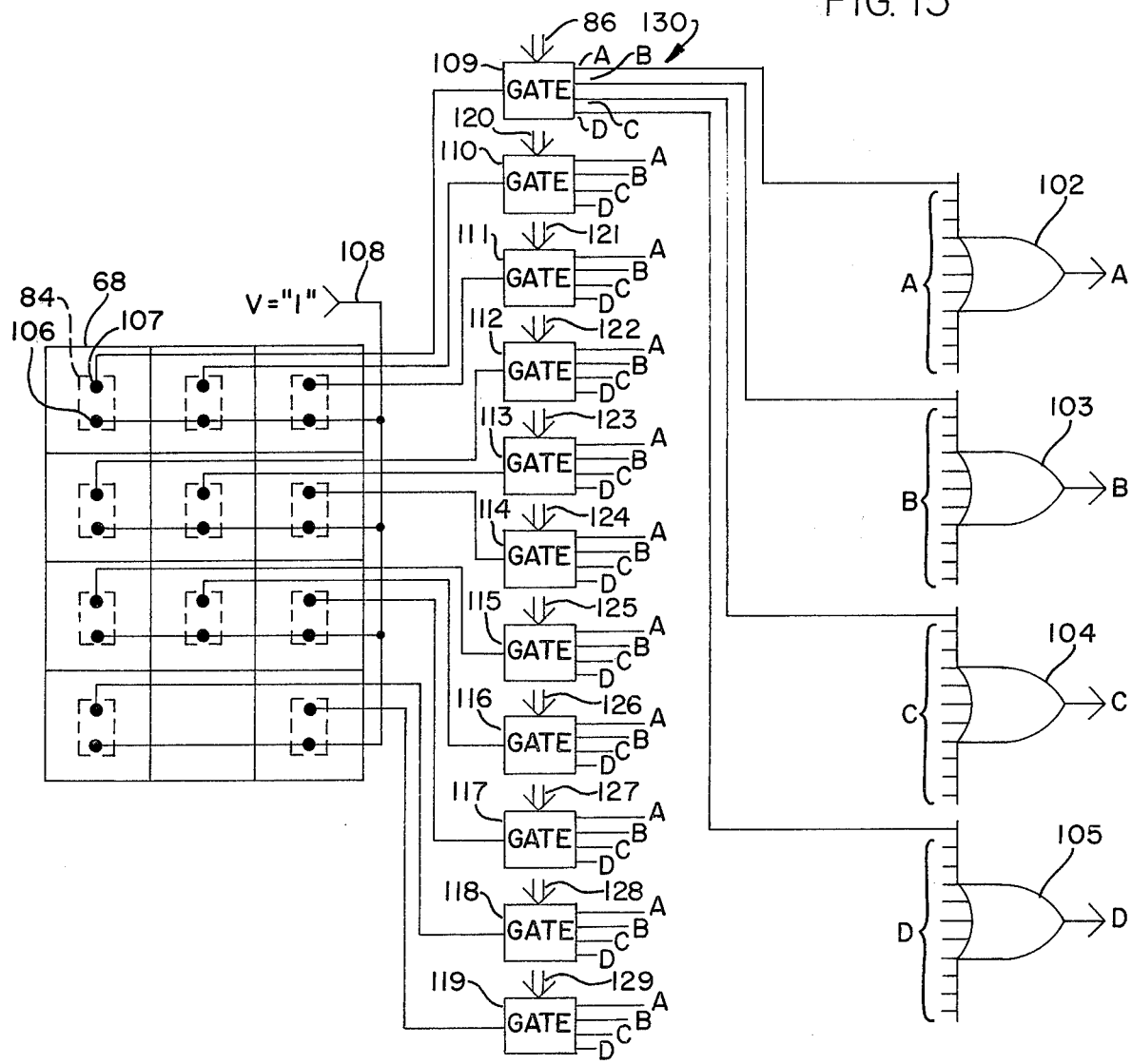

In the drawing:

FIG. 1 represents a telecommunication and/or teleprocessing network, including customer/vendor terminal entry devices in accordance with the present invention;

FIG. 2, a perspective view of the double keyboard terminal console;

FIG. 3, a plan view of the double keyboard terminal console;

FIG. 4, a side elevation section of the console;

FIG. 5, a plan view of the console keyboard floor;

FIG. 6, a side partially sectioned view of entry key and underlying console readout matrix;

FIG. 7, a top view of the key structure of FIG. 6;

FIG. 8, a functional schematic diagram of an exampled console readout matrix and related key probe geometry for binary code readout of numerical key entries;

FIG. 9, a truth table for the binary readout matrix system of FIG. 8;

FIG. 10, an exampled numeric key probe geometry usuable with the readout matrix system of FIG. 8;

FIG. 11, a functional diagram showing provision for an electronic numeric entry key realignment system;

FIG. 12, a key structure top view showing input code line connection to the key structure of FIG. 11;

FIG. 13, a partially perspective view of sliding contact interconnect between input code lines and key structure of FIG. 12;

FIG. 14, a functional schematic of an exampled console readout matrix for use with the key structure system of FIG. 11;

FIG. 15, a functional diagram showing provision for an alternate electronic numeric key realignment system; and FIG. 16, a functional schematic diagram of an exampled console readout matrix and related key probe geometry for the numeric key readout system of FIG. 15.

Referring to the drawing:

FIG. 1 represents a possible interconnection system within which the terminal keyboard entry device is useable. A central computer 20 in the depicted network forms the heart of an immediate communications path from the purchasing customer, through the participating vendor/merchants 21, through the central computer system 20, and to the participating bank 22 or credit card company 23. Each of the vendor merchants 11 depicted in the example system of FIG. 1, such as participating restaurants, stores, air lines, motels, hotels, travel agency and car rental agency, represents the location of a double keyboard terminal device to be herein described. Depicted interconnects 24 between vendor merchants 21 and central computer 20, interconnects 25 between computer 20 and participating banks 25, and interconnects 26 between computer 20 and credit companies 23, might comprise various available data communication line services.

In the money exchange system of FIG. 1, for reasons of security, the means for entering and completing money exchange transactions on site at the vendor locations 21 must understandably include provisions for private, unobservable and undetectable numeric code entries on behalf of vendor and customer such that the vendor, for example, is not given access to a customer's credit and verification secret code, or, that the customer is not apprised of the vendor's account verification code, or, still further, that a third party observer cannot gain access, through visual "eavesdropping," of the private code numbers of either vendor or customer. It is to this security that the double keyboard entry terminal of the invention is primarily directed.

Credit cards contemplated for usage in the money exchange system of FIG. 1 would be new, in that the entire number of the purchaser would not be on the card. The remaining portion of the number (not on the card) would be given to the holder separately and memorized by him along with a verification code name. In a typical transaction the card holder might give his card to the merchant, who would then tap out the numbers on the card on his side of the console, the card holder would then tap out the remaining memorized numbers, thereby completing this portion of the transaction. This would eliminate the possibility of the merchant copying the number. The merchant might then tap out his code number to tell the computer where the sale is being made. This is acknowledged by the computer on an entry terminal digital display window, telling the merchant to record the transaction. The amount of the sale would be then tapped in and displayed on both digital display windows. The computer would then approve or disapprove the transaction. If the transaction is approved, the computer would then charge the sale to the card holder and credit the account of the merchant.

Checks might be handled in the same manner in conjunction with participating banks, with the exception that the full account number is inserted by the merchant, and the writer would have to tap out his memorized code name to verify the authenticity of the check. Entries in this system are made immediately which eliminates the outstanding check situation.

Cash transfers can be accomplished the same as the credit cards since the purchaser or depositer will carry a cash numbered card.

In all of the above system possibilities, the vendor and customer must each be protected from access by one party to private code numbers of the other, to prevent unauthorized use, one by the other. Still more ominous, would be detection by a third party of private codes of the vendor and/or customer involved in a transaction. The user terminal entry device, to be described, uniquely provides the security to preclude access between customer and vendor to secret identification code numbers of the other, and to preclude access of a third party observer to secret codes of either the customer or vendor involved in a money transaction via co-use of the terminal entry device.

Referring to FIG. 2, the terminal entry keyboard and display device is comprised of a common housing 28 with two discrete keyboards. A first keyboard 29, for use of the customer, and a second keyboard 30, for store use, extend oppositely from a raised, centrally located, double-sided display device 31 for respective private viewing by vendor and customer. The sides 32 of the device may be angled upwardly from the end extreme 33 such that at least a portion of the respective keyboards are inclined toward the viewer. This feature, in conjunction with the raised display device 31, provides a first measure of security by obscurring entries made by one party from observance by the other.

As depicted in FIG. 2, the keyboards comprise respective centrally oriented numeric entry key fields 34 and 35, oriented in a generally horizontal plane with the base 36 of the terminal 27. A plurality of pre-programmed functio keys 38 are arranged about the numeric entry key field of the customer's keyboard 29, as are a plurality of pre-programmed function keys 39 about the numeric entry key field 35 of the vendor's keyboard 30.

As above stated, some of the customer function keys 38 are common with function keys 39 on the vendor side, and others are unique to the customer's needs in making secured, private transactions through the terminal to banks and credit card companies which may up the complete transaction system.

As shown in FIG. 2, all keyboards are recessed within the respective keyboard fields, to preclude observance of key functions by parties other than the one making the entries. As thusfar described, the double keyboard console is seen to permit private entries by respective parties engaged in a transaction.

The respective numeric entry key fields 34 and 35, for use by customer and vendor are provided with special security features, since these keys are used to enter private numbers and codes and thus, should not be observable by anyone other than the party making the secret entry. Accordingly, means are employed to assure privacy in entering numbers. Security measures, to this end, in accordance with the present invention, comprise means for numeric keyboard function realignment, both mechanical and electronic, in addition to physical and optical key function identification means which limit key function identification to a field of view which precludes observations by third parties, and permit any key in the numeric entry key field to have a reassigned function known only to the party making the entries.

Thus, in addition to the physical screening provided between customer and vendor engaged in a transaction, numeric entry key field function realignment to be described precludes a third party from gaining access to a secret numeric code entry by memorizing the code entry by merely observing the physical pattern used when codes are entered into the terminal. Referring to FIG. 3, the respective numeric numbered entry key fields 34 and 35 are seen to comprise 11 keys for entry of numbers 0 through 9 and decimal point, respectively. Were the keys for the vendor key field 35 limited to respective functions as depicted in FIG. 3, a party, by "visual eavesdropping," might easily gain access to a secret numeric entry, such as a verification code, by observing the physical pattern of key entries made by the vendor, even though he might be precluded from observing the key function identifying labels.

Means, both mechanical and electronic, for realignment of numeric key entry functions will be described, by means of which key function realignment, known only to the party making entries, renders secret numeric entry detection by physical observation of key entry patterns virtually impossible. The key function realignment to be described, both mechanical and electronic, is uniquely provided by key carried contact probe means selectively engageable, upon key depression, with an underlying connector matrix from which, for example, an output code defining respective key entry functions is obtainable.

Referring to FIG. 4, depicting section 4—4 of FIG. 3, the terminal keyboard comprises depressible key structures each carrying contact probes engageable with an underlying matrix. Depicted numeric keys 34a – 34d in the customer numeric entry key field 29, carry respective probe means 40a – 40d selectively engageable, upon key depression, with respective conductor groups 41a – 14d on underlying matrix 42. Similarly, depicted numberic keys 35a – 35d in the vendor numeric key field 30, carry respective probe means 43a – 43d selectively engageable, upon key depression, with respective conductor groups 44a – 44d on the underlying matrix 42. The probe means are functionally depicted in FIG. 4 as being contactable with, for example, discrete conductor pair permutations of the matrix carried conductor groups.

Each of the keys may comprise a housing member, within which compressible key structure is carried. For example, vendor key 35d comprises a depressable center member 45 carried in housing 46. The key housings are square in cross section such that the depressible center key structure is constrained from rotating with respect to the housing, and thus with respect to the underlying matrix 42.

For particular usage in a mechanical key function realignment feature to be described, each of the key housings rests on an underlying keyboard floor member 47. As best shown in FIG. 5, the keyboard floor member 47 is formed with a plurality of through-openings 48 sized to accommodate passage of depressible key center probe carrying members therethrough while providing a surface upon which the bottoms of the key housings are slidably engageable. As shown in FIGS. 3 and 4, the respective numeric key housings are abutted with adjoining surfaces of one another and the field of keys is laterally confined within a rectangular opening defined by vertical wall members, such as end-wall members 49 and 50 of FIG. 4. In assembled relationship, the keyboard top plate member 51 provides an opening for access to the numeric key field. Referring to FIG. 3, it is seen that the key structures are one less than the number to completely occupy the field geometry, such that the key structures may be moved laterally to occupy discretely different positions in the field, while being constrained from rotation within the field.

The geometry of the underlying matrix 42, as will be further exampled, permits any one key, by means of its discrete contact probe means to output its assigned entry function, regardless of that key's physical position within the numeric key field. The key functions in the numeric entry field may thus be realigned by repositioning in the key field, before, and/or during, and/or after an entry sequence to preclude an observer (eavesdropper) from ascertaining, from the physical key position entry sequence, the actual numeric entry sequence that was made.

Details of key member structure, probe geometry and matrix geometry useful in effecting mechanical key function realignment are illustrated in FIGS. 6–10.

FIG. 6 depicts a typical key structure and its mounted relationship with the underlying matrix. The key structure 52 comprises a square housing member 53 within which a compressible key member 54 is received. Member 54 is comprised of an upper portion 55 carrying a top mounted display member 56, over which a magnifying lens member 37 may be fixed. Depression of the key structure 54 within housing 53 is made against the restraints of a compression spring 57 confined between bottom of key structure 54 and inwardly directed restraining means 58 affixed to the housing 53. A probe plate 59, slideably receivable in housing 53, is mounted to the upper depressable 54 by a further compression spring means 60. Probe plate 59 carries thereon contact probe means 61, which engage conductors 62 of underlying matrix when the key is depressed. Matrix 42, as depicted may be space-mounted from the base plate 36 by means of support members 63 underlying the matrix conductors 62.

Display means 56 carries the key entry function display, e.g., 8. This function "label" may be extremely small and readable only by viewing through magnifying lense 37 within a restricted field of view from direct vertical observation, as depicted in top view of FIG. 7. Further, the key structure is recessed in housing 53 to further enhance obscurity of entry.

An exampled matrix useful in reading out key entry assigned codes for a particular key, regardless of that key's position in the numeric entry key field, is functionally depicted in FIG. 8. The matrix 42 is comprised of four conductor pairs extending across each key row of the numeric key entry field. For example, four conductor pairs 64, 65, 66 and 67 are extended across the top row of the field. Similar conductor pairs are extended across each of the remaining rows of the field. The conductors may be etched, by printed circuit techniques on a printed circuit board 68. Top ones of each of the conductor pairs in each of the rows are connected in common to a voltage source 69, which might correspond to a binary 1 voltage level. Second ones of each of the conductor pairs in the matrix are connected to a binary code generating means 70. Lower ones of the conductors of conductor pairs 64–67 in the top row of the matrix field are connected individually as respective first inputs 71–74 to NOR gates 75–78. Likewise, lower ones of the conductor pairs in the second row 79 of the matrix field are connected individually as respective second inputs to NOR gates 75–78, as are those in the third row 80 as respective third inputs to NOR gates 75–78, and those in the bottom row 81 as respective fourth inputs to NOR gates 75–78.

Now, assuming the numeric entry keys for digits 0 through 9 and the decimal point are physically oriented as depicted in FIG. 8, and the probe means carried by the respective keys are such as to impose a shorting electrical connection between the conduct pairs in the field rows (as indicated by the heavy shorting bar lines of FIG. 8) depression of the respective keys for probe contact with the underlying matrix conductor generates a binary code output on the respective NOR gate output lines A, B, C, D, corresponding to the decimal function assigned the keys. As shown in the truth of FIG. 9, depression of keys for probe contact with the matrix generates the complement of the corresponding binary code as outputs designated $\bar{A}$, $\bar{B}$, $\bar{C}$ and $\bar{D}$ in FIG. 8. The illustrated interconnection to NOR gates 75–78 provides inversion to true binary from the complement inputs thereto, and it is seen that any one of the keys and its associated probe geometry will generate a binary output from NOR gates 75–78 corresponding to the assigned decimal entry function for that key, regardless of the key's physical position in the numeric entry key field.

FIG. 10 illustrates a probe structure which might be used with the matrix of FIG. 8 for the key assigned the numeric entry 2 to generate a binary two outputs code from NOR gates 75–78. The probe 59, 61 may be fashioned of conductive material having a first downward projection 82 for shorting contact across conductor pair 64 upon key depression. A second downward projection 83 provides a shorting contact between each of conductor pairs 66 and 67, upon key depression. Conductor pair 65 is not shortened upon key depression. The lower one of the conductor pairs in the row within which the 2 key residues thus generates a binary-two complement output and the NOR gates 75–78 output a pure binary-two code.

As functionally depicted in FIG. 8, each numeric entry key has a probe geometry discretely configured to effect a conductor-pair shorting permutation so as to generate a binary output from NOR gates 75–78 corresponding to the numeric function assigned that key. Thus mechanical key function realignment, for entry security, may be realized by laterally positioning the numeric entry keys within the numeric keyboard field to different position permutations with retention of function.

A security means to provide key function realignment on an elctronic basis is depicted functionally in FIG. 11. As with the aforedescribed mechanical realignment feature, the electronic realignment feature incorporates key carried probe means selectively engageable with an underlying matrix. Now, however, the keys retain fixed positions, and the matrix provides a means for changing code readouts for each key position in the field, as well as key display of the entry function "assigned" that key at the time of entry.

Referring to FIG. 11, a typical key with provision for electronic realignment of entry function includes a probe means 84 for individually contacting, upon key depression, each of four matrix carried conductors, designated A, B, C and D, respectively. A selected, or alternatively, a randomly sequenced, key assigned binary code source 85, via 4-line interconnect 86, applies an assigned code from the generator 85 to the respective probes 84 of the key. The code carried on lines 86 is additionally applied to an electronic function display means integrally carried in the depressable center member 54' of the key. As shown functionally in FIG. 11, the display device might comprise a 4-wire binary to 7-bar decoder 87 which decodes the binary input thereto to a multi-line output 88 inputted to a LED 7-bar numeric display 89.

The assigned code on lines 86 from generator 85 is thus decoded and displayed for key function readout by the operator. When the key is depressed for entry purposes, the 4-wire binary code on lines 86 to the key probes A, B, C and D is imparted to the underlying lines in the matrix to provide an output code from the matrix corresponding to the instantly assigned function of that key.

FIGS. 12 and 13 depict an exampled implementation for connecting the 4-wire assigned input code on lines 86 to the electronic display device integrated in the depressable portion of the key, as well as to the contact probe means of the key. As shown in the top view of FIG. 12 and perspective view of FIG. 13, the key housing 53 may have imbedded therein four contact bar members 90–93. The display carrying membeer of depressable key depressable key structure may carry contact members 94–97 for sliding engagement with housing carried contact members 90–93 to provide continuity of input of the assigned code on lines 86 to the decoder 87 of FIG. 11. Further contact members, 98, 99, 100–101, carried by the probe plate assembly of the key, would provide continuity of input of the assigned code on lines 86 to the probes 84 of FIG. 11.

FIG. 14 shows, functionally, the underlying matrix for use with the key means of FIG. 11. Again, four conductors are oriented for contact with key probes in each of four rows. The assigned code for any depressed key is imparted by that key's probe contact with the underlying four conductors. The A-conductors of each row of four conductors are connected as respective inputs to an OR gate 102, the B-conductors of each row are connected as respective inputs to OR gate 103, the C-conductors as respective inputs to OR gate 104, and the D-conductors as respective inputs to OR gate 105. The entry function code inputted to a key at time of key depression is displayed numerally by that key and imparted to the matrix to cause the assigned code at time of key depression to appear on the outputs of the OR gate 102–105.

An alternative electronic key realignment means is shown in FIGS. 15 and 16. In FIG. 15, the assigned key binary code source 85 again provides, either on a selected or randomly sequenced basis, a four-wire binary code output via lines 86 to the converter 88 in the depressible key center member 54" to provide a multi-line output 88 to drive display device 89. Sliding contact interconnect between key member 54" and the code output lines 86 from generator 85 may be like that depicted in FIG. 12.

The probe means 84' of the key comprises a single shorting bar member which engages a pair of matrix carried contacts, with a discrete contact pair being oriented for probe contact in each key row of the numeric entry key field. A typical matrix row contact pair 106–107 is shown in FIG. 15.

As shown in FIG. 16, the lower ones of the contact pairs in each row are connected in common to a voltage source 108 which coprises a binary 1 logic level. The upper ones of each contact pair in the matrix are individually connected to an associated one of a plurality of gating means 109–119, one such gating means thereby associated with each key in the field. The discretely assigned code on lines 86 from generator 85 is thus gated through gate 109 as coded output 130 upon depression of the key in the upper left hand corner of the field. Likewise, discretely assigned codes on lines 120–129 to each of the remaining keys in the field are gated by associated gates 110–119 upon depression of the respective keys. The four-wire binary code outputs A, B, C and D from each of the gates 109–119, by means of OR gates 102, 103, 104 and 105, appear on common output lines A, B, C and D. It is seen that the end result of the alternate electronic key entry function realignment system of FIGS. 15 and 16 is like that of the previously described embodiments of FIGS. 11–14, in that fixed position numeric entry keys in the field may be, for security reasons, assigned different function permutations, with the instantly assigned function being annunciated by a key carried display device.

Whereas this invention is herein illustrated and described with respect to several embodiments thereof, it should be realized that various changes may be made without departing from essential contributions to the art made by the teachings hereof.

I claim:

1. A keyboard terminal for use with a central computer whereby money transactions between a vendor and customer may be electronically completed via the collective keyboard entries made by vendor and customer comprising, first and second discrete keyboards for respective use of vendor and customer, said keyboards extending oppositely from a raised central display device housing discrete displays on respective opposite sides thereof for respective viewing by vendor and customer, each of said first and second keyboards comprising a plurality of function activating keys and a plurality of numeric entry keys, the depressible upper portion of at least each said numeric entry key comprising a visible display means for identifying the associated key function, with said display means being recessed within the associated keyboard surface to limit readability thereof only within a restricted angular field of view from vertical; said numeric entry keys arranged adjacently to form a predetermined geometric pattern; said numeric entry keys being physically aligned for depression contact of key carried probe means with an underlying connector matrix for generation of a related code word output definitive of that key function; means to realign said key numeric entry functions comprising means for physically moving one or more numeric entry keys in the plane of the keyboard and within the confines of the geometric pattern collectively defined by said numeric entry keys.

2. The keyboard terminal of claim 1, wherein said numeric entry keys are arranged within the confines of a rectangular geometric pattern, each key being carried within a square housing, the sides of which slidably abut sides of adjacent ones of said housings, with the outer ones of said key housings being slidably abutted with a fixed wall means of said keyboard, the number of said numeric keys being at least one less than the number of key housings receivable within said fixed wall means.

3. A keyboard terminal for use with a central computer whereby money transactions between a vendor and customer may be electronically completed via the collective keyboard entries made by vendor and customer comprising, first and second discrete keyboards for respective use of vendor and customer, said keyboards extending oppositely from a raised central display device housing discrete displays on respective opposite sides thereof for respective viewing by vendor and customer, each of said first and second keyboards comprising a plurality of function activating keys and a plurality of numeric entry keys, the depressible upper portion of at least each said numeric entry key comprising a visible display means for identifying the associated key function, with said display means being recessed within the associated keyboard surface to limit readability thereof only within a restricted angular field of view from vertical; said numeric entry keys arranged adjacently to form a predetermined geometric pattern; said numeric entry keys being arranged in a fixed position within said predetermined geometric pattern; means to realign said key numeric entry functions comprising means connecting a predetermined discrete binary code input to each of four key carried probe means carried by each of said keys, an underlying connected matrix with which said key carried probe means are engageable upon key depression, said display means of each of said numeric entry keys comprising an electronic numeric readout device, and means connecting said discretement binary code on each of said numeric entry key probe means to the electronic numeric readout device associated with that numeric entry key.

4. The keyboard terminal of claim 3 with means for selectively applying predetermined different permutations of said numeric entry key input binary codes to the probe means of said plurality of numeric entry keys.

5. The keyboard terminal of claim 3 with means for randomly sequencing the permutations of said numeric entry key input binary codes to the probe means of said plurality of numeric entry keys.

6. A keyboard terminal for use with a central computer whereby money transactions between a vendor and customer may be electronically completed via the collective keyboard entries made by vendor and customer comprising, first and second discrete keyboards for respective use of vendor and customer, said keyboards extending oppositely from a raised central display device housing discrete displays on respective opposite sides thereof for respective viewing by vendor and customer, each of said first and second keyboards comprising a plurality of function activating keys and a plurality of numeric entry keys, the depressible upper portion of at least each said numeric entry key comprising a visible display means for identifying the associated key function, with sid display means being recessed within the associated keyboard surface to limit readability thereof only within a restricted angular field of view from vertical; said numeric entry keys arranged adjacently to form a predetermined geometric pattern, said numeric entry keys being arranged in a fixed position within said predetermined geometric pattern; means to realign said key numeric entry functions comprising means connecting a predetermined discrete binary code input to a key carried electronic numeric readout device, each of said keys carrying a probe means, an underlying connector matrix with which said key carried probe means are selectively engageable upon key depression, and gating means receiving the predetermined discrete binary codes inputted to said key readout devices and receiving a matrix generated enabling input to gate the instantly assigned binary code for a key to a common output upon that key being depressed for associated probe contact with said connector matrix.

7. The keyboard terminal of claim 6 with means for selectively applying predetermined different permutations of said numeric key input binary codes to the respective readout device and gating means associated with each key.

8. The keyboard terminal of claim 6 with means for randomly sequencing the permutations of said binary code inputs as applied to said key readout devices and associated gating means.

9. A keyboard terminal for use with a central computer whereby money transactions between a vendor and customer may be electronically completed via the collective keyboard entries made by vendor and customer comprising, first and second discrete keyboards for respective use of vendor and customer, sad keyboards extending oppositely for respective viewing by vendor and customer, each of said first and second keyboards comprising a plurality of function activating keys and a plurality of numeric entry keys, means to effect realignment of the entry function of at least one numeric entry key by moving that key in the plane of the numeric entry keys, and means for physically screening the respective key entry activity of said vendor and customer, one from the other.

10. The keyboard terminal of claim 9 with said means for physically screening comprising a raised, centrally oriented, and at least partially hooded, double-sided display device, each side of said display being restricted to display readout of key entry activity made only on the keyboard on that side of said terminal.

11. The keyboard terminal of claim 10 with the keys in the respective vendor and customer keyboards carrying key function identify display means physically oriented for readability thereof within a restricted viewing angle.

12. The keyboard terminal of claim 9, with means to realign the entry function of at least one numeric entry key moving that key in the plane of the keyboard.

* * * * *